(12) United States Patent
Andreasen

(10) Patent No.: US 12,264,098 B2
(45) Date of Patent: Apr. 1, 2025

(54) CURING OVEN AND METHOD OF CONTROLLING CURING OVEN

(71) Applicant: ROCKWOOL A/S, Hedehusene (DK)

(72) Inventor: Ole Andreasen, Hedehusene (DK)

(73) Assignee: ROCKWOOL A/S, Hedehusene (DK)

( * ) Notice: Subject to any disclaimer, the term of this patent is extended or adjusted under 35 U.S.C. 154(b) by 351 days.

(21) Appl. No.: 17/792,442

(22) PCT Filed: Jan. 15, 2021

(86) PCT No.: PCT/EP2021/050858
§ 371 (c)(1),
(2) Date: Jul. 13, 2022

(87) PCT Pub. No.: WO2021/144451
PCT Pub. Date: Jul. 22, 2021

(65) Prior Publication Data
US 2023/0123109 A1   Apr. 20, 2023

(30) Foreign Application Priority Data
Jan. 17, 2020 (DK) .............................. PA 202070036

(51) Int. Cl.
| | |
|---|---|
| *F27B 9/28* | (2006.01) |
| *C03B 37/10* | (2006.01) |
| *D04H 1/4209* | (2012.01) |
| *D04H 1/58* | (2012.01) |
| *F27B 9/10* | (2006.01) |
| *F27B 9/40* | (2006.01) |
| *G01B 15/06* | (2006.01) |

(52) U.S. Cl.
CPC ............ *C03B 37/10* (2013.01); *D04H 1/4209* (2013.01); *D04H 1/58* (2013.01); *F27B 9/10* (2013.01); *F27B 9/40* (2013.01); *G01B 15/06* (2013.01); *F27M 2003/08* (2013.01)

(58) Field of Classification Search
CPC ......... F27B 9/28; F27M 2002/11; C21D 9/54; C21D 9/56; G01B 15/06
See application file for complete search history.

(56) References Cited

U.S. PATENT DOCUMENTS

| | | |
|---|---|---|
| 2,997,096 A | 8/1961 | Morrison et al. |
| 3,096,161 A | 7/1963 | Morrison et al. |
| 4,028,051 A * | 6/1977 | Lundstrom ............. F27B 9/243 34/236 |

(Continued)

FOREIGN PATENT DOCUMENTS

| | | | |
|---|---|---|---|
| CN | 107620436 A * | 1/2018 | |
| CZ | 283012 B6 * | 12/1997 | ............... D04H 1/00 |

(Continued)

*Primary Examiner* — Gregory A Wilson
(74) *Attorney, Agent, or Firm* — DINSMORE & SHOHL LLP

(57) ABSTRACT

A curing oven for curing a mineral wool web includes an air permeable conveyor for advancing the mineral wool web through a substantially closed cabinet from a mineral wool web inlet provided at one end of the cabinet to a mineral wool web outlet provided at another end of the cabinet. The curing oven also includes a heated air inlet arranged for directing a flow of heated air through the conveyor. The curing oven includes at least one wool deformation detector.

10 Claims, 3 Drawing Sheets

(56) References Cited

U.S. PATENT DOCUMENTS

| | | | |
|---|---|---|---|
| 4,263,007 A | | 4/1981 | Battigelli et al. |
| 4,662,840 A | * | 5/1987 | Ellison .................. F27D 17/004 |
| | | | 34/212 |
| 9,664,443 B2 | | 5/2017 | Celle et al. |
| 2005/0160711 A1 | * | 7/2005 | Yang .................... D04H 1/4218 |
| | | | 55/528 |
| 2009/0140464 A1 | | 6/2009 | Yang et al. |
| 2010/0119985 A1 | * | 5/2010 | Potterill ................ D04H 1/645 |
| | | | 432/2 |

FOREIGN PATENT DOCUMENTS

| | | | | |
|---|---|---|---|---|
| EP | 1794383 A1 | | 6/2007 | |
| EP | 1997944 A1 | * | 12/2008 | ........... D04H 1/4209 |
| NO | 327894 B1 | * | 10/2009 | ............... D04H 1/06 |
| PT | 1280663 E | * | 1/2007 | |

* cited by examiner

CURING OVEN AND METHOD OF CONTROLLING CURING OVEN

CROSS-REFERENCE TO RELATED APPLICATIONS

This application is the U.S. National Stage of PCT/EP2021/050858 filed on Jan. 15, 2021, which claims priority to Denmark Patent Application PA 202070036 filed on Jan. 17, 2020, the entire content of both are incorporated herein by reference in their entirety.

FIELD OF THE INVENTION

Production of mineral wool, such as man made vitrous fibres (MMVF), comprises fiberizing a stone or glass melt into thin fibres and collecting these fibres on a conveyor, thereby forming a web of fibres. Man-made vitreous fibres may be produced in different ways, such as in a spinning cup (typically used for producing glass wool fibres) or on a cascade spinner (typically used for producing stone wool fibres). A binder for bonding the fibres together is applied to the fibres at or after formation of the fibres, and the web of fibres are heat treated in a curing oven to cure the binder and thereby form a coherent web of fibres.

BACKGROUND OF THE INVENTION

Curing ovens are an important component in the production of mineral wool, as curing ovens have strong influence on the quality of the final mineral wool mat, and further influence the manufacturing cost of the mineral wool products. Generally, a range of different mineral wool products are produced using the same curing oven. Density of the mineral wool produced may vary a, e.g. from 20 kg/m$^3$ to 250 kg/m$^3$ depending on the intended use of the final mineral wool product, and the thickness of the web may vary from e.g. 40 mm to 200 mm. Further very different products are produced to order and just-in-time to avoid having to stock the often bulky products, which means that during a day of production a lot a different products with different specification will be produced on the same line, requiring quick change-over from one product to another. Melt production and hence melt flow is not easily adjusted on short notice, so the melt flow and hence fibre production will often be fairly constant (in amounts of up to 20 tons per hour), so the conveyor speed will be adjusted to fit the thickness and density of the product produced (with conveyor speeds up to 40 m/s), and accordingly the residence time for the wool web in the curing oven will depend on this. The operator should hence constantly adjust the settings of the curing oven to ensure full curing and avoid destroying the web e.g. by excessive heating. Finally, curing ovens often form a bottle neck in mineral wool production, especially with increased fibre formation giving rise to a need for higher throughput and shift to other types of binder putting restrictions on the maximum curing temperature. Curing ovens are not easily extended, as the curing ovens often have a length of 20-40 meters, and normally there is not extra room for an extension of the curing oven within existing buildings, and also in view of the heavy machine parts before and after the curing oven a rebuilding of an existing curing oven is a time consuming and costly affair. These different demands on the curing oven pose some challenges, and there is a need for an improved curing oven.

Curing ovens and optimization thereof has been be subject for numerous patents for at least 60 years. Examples of such earlier curing ovens include U.S. Pat. Nos. 2,997,096, 3,096,161, 4,263,007, 9,664,443, and European patent no. 1794383.

SUMMARY OF THE INVENTION

One of the challenges associated with curing of mineral wool is that the mineral wool should be fully cured at the exit of the curing oven. Further care should be taken to avoid destroying or deforming the web in the process of curing it.

The invention relates to a curing oven for curing a mineral wool web, the curing oven comprising an air permeable conveyor for advancing the mineral wool web through a substantially closed cabinet from a mineral wool web inlet provided at one end of the cabinet to a mineral wool web outlet provided at another end of the cabinet, the curing oven further comprising a heated air inlet arranged for directing a flow of heated air through the conveyor.

An object of the present invention is to provide a curing oven capable of increased throughput.

In order to achieve this object the curing oven according to the invention comprises at least one wool deformation detector configured for detecting wool deformation inside the curing oven.

DETAILED DESCRIPTION OF THE INVENTION

By wool deformation is meant unwanted compression of wool in partial areas of the wool web. Wool deformation may take place in the curing oven if pressure of heated air on the wool web is too high, meaning that air flow resistance of the wool web will lead to pressure on the wool web exceeding the compression strength of the wool web so that the wool web will give in and compress further. Compression strength of an uncured wool web is lower than the compression strength of a cured wool web, so the wool web is prone to deformation in the uncured or partially cured phase in the curing oven. Production of mineral wool is a rather chaotic process and the resulting mineral wool web often has some variation in parameters, so there may be areas that cure slower than other areas, and the uncured areas will be subject to deformation. Curing will initiate from the side of the wool web facing the heated air entry and progress through the core of the web to the other side of the wool web until the entire wool web is fully cured at the end of the passage through the curing oven. In case of wool deformation the wool web will have areas that does not have the correct thickness and hence should be discarded. Minor deformation resulting in a thickness of e.g. 95% could be acceptable, and rejection could also be dependent on the extent of the surface area having deformation. Generally the aim is to detect wool deformation (compression) of at least 4 mm of the thickness of the wool web.

The wool deformation detector may for example be a device for measuring the thickness of the web at different locations across the width of the web, such as using laser thickness measurement. Laser thickness measurement could be achieved by using a laser to detect distance to the wool web surface. If the detected distance increases it means that the wool web is not in contact with the conveyor and is subject to unwanted compression. Of course, the laser needs to be able to reach the wool web, which poses some challenges in view of the conveyor, so suitable openings should be arranged in the conveyor, at least at suitable intervals. Alternatively pressure or contact sensors could be arranged on the conveyor to detect if the wool web is not in contact with the conveyor and hence that the wool web is subject to unwanted compression.

The wool deformation detector enables immediate information to an operator or a control system to change process parameters of the mineral wool production line, such as pressure of the heated air. Hereby the curing oven may be operated close to the maximum curing oven capacity limit, thereby reducing the amount of scrap and/or increasing the productivity and/or improving energy consumption in the curing oven. Previously curing oven operation has widely been based on operator experience and knowledge accumulated over the years. Visual inspection, measurements and/or tests of the finished products would show if there was a problem with wool deformation in the curing oven, whereas it would not be clear whether the curing oven could have been operated closer to the limit, which often leads to operating the curing oven with a wide safety margin to the maximum, and thereby relatively high cost and/or low capacity of the production.

According to an embodiment the wool deformation detector comprises a transmitter arranged at a first edge region at one side of the conveyor and a receiver arranged at a second edge region of at an opposite side of the conveyor to transmit an electromagnetic signal transversely through the web. The transmitter and receiver may be arranged outside the cabinet of the curing oven. Inside the curing oven cabinet there is a generally adverse environment with relatively high temperatures, fumes, dust and high air flow, which is disadvantageous for the wool deformation detector.

The electromagnetic signal may be any signal suitable for travelling through the mineral wool web across the width of the web. X-rays are preferred as they are known to be able to travel through mineral wool webs, and are used for other purposes on mineral wool production lines, e.g. density measurements. Alternatives include gamma rays or technology based on isotopes.

According to an embodiment of the curing oven the receiver has a vertical extension of 10-20 mm. If the receiver has a much larger vertical extension there is a risk that it will be difficult to detect wool deformation due to averaging, and if the vertical extension is much smaller there is a risk of misalignment or non-detection.

In the simplest form the curing oven has only one zone, but it is advantageous if the curing oven comprises a plurality of zones, and a wool deformation detector is arranged in at least one of the zones, preferably in the first half of the curing oven seen in direction of transport of the conveyor. Generally, the wool is most vulnerable at the entry to the oven where the binder is not cured yet, so here the pressure of the heated air should be low, and the pressure can be increased as the wool cures during the passage through the curing oven.

An aspect of the invention relates to a curing oven control system for a curing oven as stated above, wherein the control system is configured to regulate pressure of the flow of heated air based on input from the wool deformation detector. This feedback makes it possible to operate the curing oven close to the limit of deforming the web, thereby maximising the curing capacity of the curing oven.

The control system may be part of the presently disclosed curing oven. I.e. an embodiment of the curing oven comprises an air permeable conveyor for advancing the mineral wool web through a substantially closed cabinet from a mineral wool web inlet provided at one end of the cabinet to a mineral wool web outlet provided at another end of the cabinet, the curing oven further comprising a heated air inlet arranged for directing a flow of heated air through the conveyor, at least one wool deformation detector configured for detecting wool deformation, preferably detecting wool deformation inside the curing oven, and a control system configured for regulating the pressure of the flow of heated air based on input from the at least one wool deformation detector.

Another aspect of the invention relates to a method for controlling a curing oven comprising the steps of: advancing a mineral wool web through a substantially closed cabinet from a mineral wool web inlet provided at one end of the cabinet to a mineral wool web outlet provided at another end of the cabinet, directing a flow of heated air through the conveyor and into the mineral wool web, detecting potential wool web deformation in the curing oven. Detection of potential wool web deformation may be used to inform an operator to adjust pressure of the flow of heated air, or may even be used in an automated system adjusting pressure.

An embodiment of the method comprise emitting an electromagnetic signal transversely through the web from the first edge region, receiving the electromagnetic signal at the second edge region opposite the first edge region, analysing the received electromagnetic signal to provide a control value, generating a first signal if the control value indicates deformation of the wool, generating a second signal if the control value indicates no deformation of the wool, regulating the pressure of heated air at the heated air inlet based on the first or second signal.

This method makes it possible to automate curing oven operation and optimise curing oven performance by operating the curing oven close to the limit of deforming the mineral wool web.

Another aspect of the invention relates to use of a curing oven according to the invention to cure a mineral wool web having a density in the range of 15-50 kg/m$^3$. The challenge of mineral wool web deformation is found to be most prevalent in relation to curing of mineral wool of relatively low density, so the biggest advantage of the curing oven is found in relation to use of the curing oven for curing mineral wool with the specified range.

The invention may be useful for curing any kind of mineral wool, but an embodiment relates to use of a curing oven to cure a mineral wool web made of fibres having a median diameter below 3 μm. The challenge of mineral wool web deformation is found to be most prevalent in relation to curing of mineral wool having relatively small diameter. Mineral wool made of fibres having a relatively small diameter is preferred in view of providing the best thermal properties. Mineral wool made of relatively thin fibres has the disadvantage that air flow resistance is higher compared to mineral wool made of thicker fibres, meaning that curing by heated air flow is more difficult and higher pressure needed, leading to increased risk of mineral wool web deformation.

The median diameter of the fibres can be obtained automatically using a scanning electron microscope (SEM) to measure the diameter of the fibres and counting the number of fibres in the sample.

The median diameter of the fibres can be obtained by the following process which is precise and minimises breaking of fibres. The process can be automated without introducing errors. Approximately 2 mg of fibres is extracted from a sample of fibres which does not contain any binder. Typically, the binder is removed by heating the fibres to 590 degrees centigrade for at least 20 minutes. The fibres are dispersed on to a glass platelet using an implosion initiated by vacuum. Pictures of the dispersed wool fibres are then acquired by optical microscopy in transmission mode. Prior to thresholding (see below), the image is convolved with a neighbourhood Gaussian filter to reduce the background noise and to bring uniformity along the fiber intensity values.

Thresholding is then performed: high gray-scale values correspond to fibers and low gray values are associated with the background or to residual noise. Isolated clustering of pixels of less than a few pixels or with an eccentricity of less than 0.5, that is, particles with roughly a circular shape, are removed as they correspond to either noise or shots.

DETAILED DESCRIPTION OF THE DRAWINGS

In the following the invention will be described in more detail with reference to examples and the figures, of which:

DETAILED DESCRIPTION OF THE INVENTION

Figure 1:
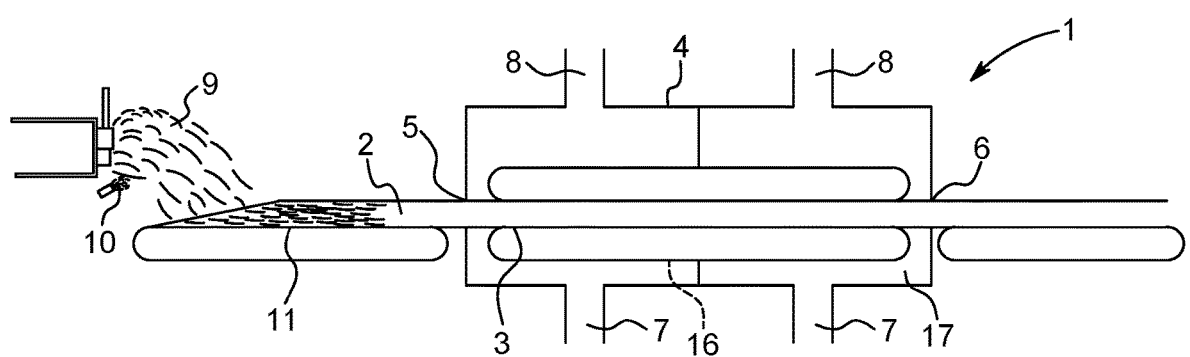
FIG. 1 is a longitudinal section of part of a prior art mineral wool production line.

Production of mineral wool is illustrated in the longitudinal section of FIG. 1. FIG. 1 illustrates production of fibres 9, application of binder 10, collection of the fibres as a mineral wool web 2 on a collection conveyor 11. The mineral wool web 2 is transported to a curing oven 1 having a cabinet 4 (shown in longitudinal section), into a mineral wool web inlet 5 of the cabinet 4, through the curing oven 1 on an air permeable conveyor 3 to a mineral wool web outlet 6. Heated air enters into the curing oven 1 through a heated air inlet 7 and is forced through the conveyor 3 and into the wool web 2 for curing the binder 10 of the mineral wool web 2. Exhaust from the curing oven is through an exit 8, and the air may be recycled and reheated or undergo waste gas treatment. In the example shown the curing oven comprises two zones 16, 17, but there may be only one or a plurality, such as seven.

Man-made vitreous fibres may be produced in different ways, such as in a spinning cup (typically used for producing glass wool fibres) or on a cascade spinner (typically used for producing stone wool fibres).

Figure 2:
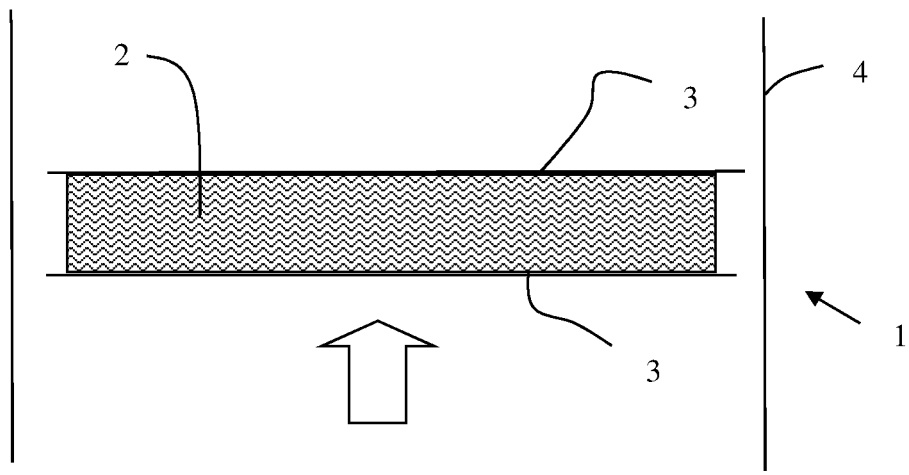
FIG. 2 is a cross sectional sketch of a curing oven.

In FIG. 2 is seen a curing oven 1 in cross section. The curing oven 1 comprises a set of conveyors 3 arranged in the cabinet 4 of the curing oven 1. The conveyors 3 are permeable to air, e.g. using perforated slats or panels. The mineral wool web 2 is arranged between conveyors 3 and transported thereby through the curing oven 1. Heated air at elevated pressure is forced into the mineral wool web 2 to heat the web and cure the binder. The temperature of the air may be adjusted to ensure drying of the web and curing of the binder. Suitable temperature depends inter alia on the specific binder and may be in the range of 180-260° C., although higher and lower temperatures are possible and may be advantageous in some cases.

Figure 3:
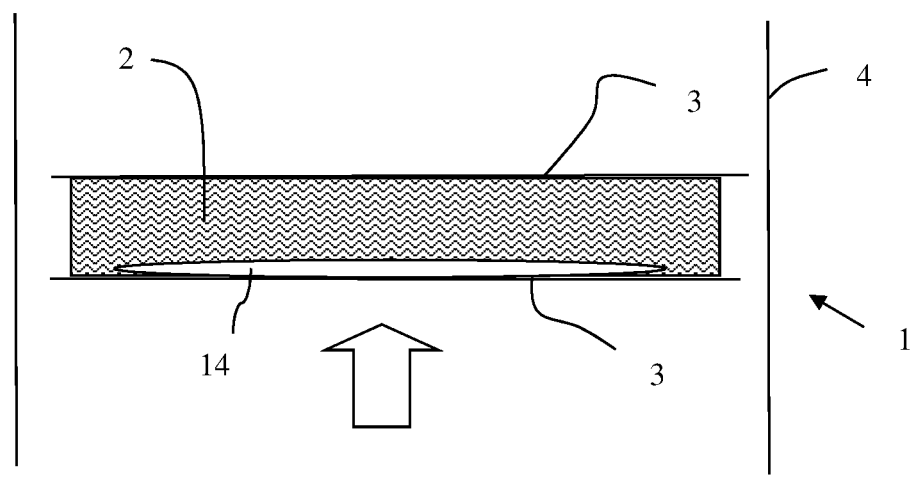
FIG. 3 is another cross sectional sketch of the curing oven.

If the pressure of the heated air in the curing oven is too high there is a risk of unwanted deformation of the mineral wool web as the wool web may lift from the conveyor and compress in areas as illustrated by the void 14 between the web and the lower conveyor seen in FIG. 3. In this event the mineral wool web is deformed prior to curing and the mineral wool web will be cured in the deformed state meaning that the product is sub standard and must be discarded.

Figure 4:
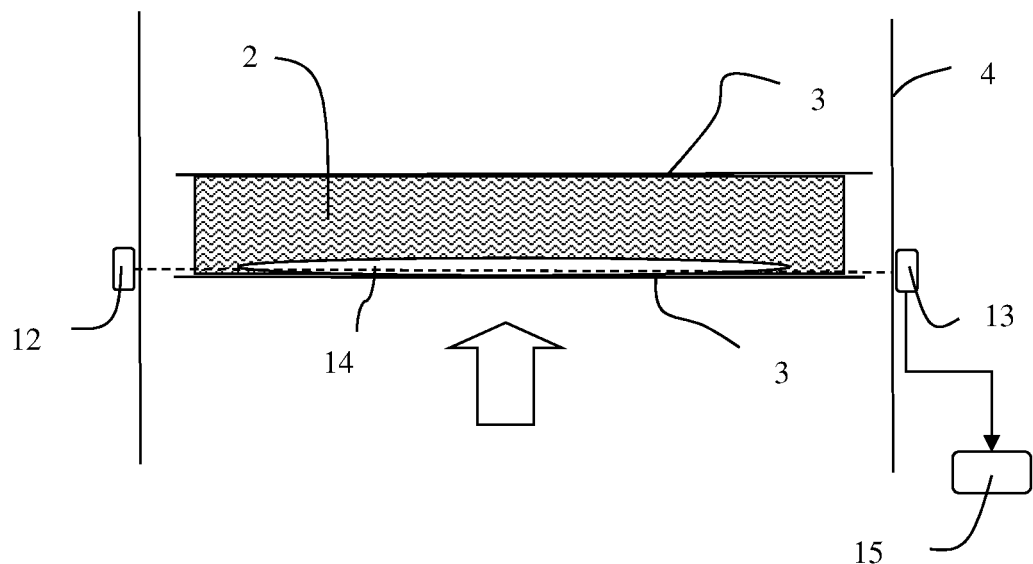
FIG. 4 is another cross sectional sketch of the curing oven.

An emitter 12 is provided at one edge region of the web to emit an electromagnetic signal crosswise through the web to a receiver 13 arranged at an opposite edge region of the web as illustrated in FIG. 4 and making up a wool deformation detector. The signal received by the receiver 13 will depend on the mineral wool between emitter 12 and the receiver 13. In case of unwanted compression leading to the wool web not being in contact with the conveyor there suddenly is less mineral wool present in the line of the emitted signal from the emitter 12 to the receiver, and hence the received signal will be different from when the signal has to pass mineral wool all the way from emitter to receiver. The signal may be analysed in a processor 15 providing a control value and a first signal indicating web deformation or a second signal indicating no web deformation. Based on the first or second signal the heated air pressure may be regulated down or up, respectively, to maximise the curing oven performance.

The emitter 12 and receiver 13 should be arranged close to the conveyor 3 into which the heated air is forced as illustrated in FIG. 4.

Figure 5:
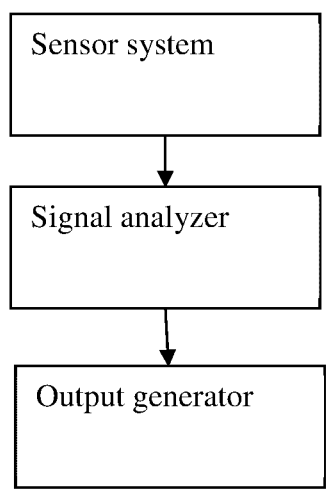
FIG. 5 is a sketch of method steps.

Method steps in operating a curing oven comprises providing a sensor system, feeding the signal therefrom into a signal analyser producing a value and generating an output using an output generator based on this value as schematically illustrated in FIG. 5. The sensor system may be an X-ray emitter and an X-ray receiver. The output from the output generator may be used for a control system regulating pressure of heated air.

The estimated potential of the invention is increasing curing oven capacity by up to 20% if the curing oven is controlled to operate closer to the limit of deforming the mineral wool web.

The invention claimed is:

1. A curing oven for curing a mineral wool web, comprising:
    an air permeable conveyor for advancing the mineral wool web through a substantially closed cabinet from a mineral wool web inlet provided at one end of the cabinet to a mineral wool web outlet provided at another end of the cabinet;
    a heated air inlet arranged for directing a flow of heated air through the conveyor;
    at least one wool deformation detector configured for detecting wool deformation inside the curing oven, and
    a control system configured to regulate pressure of the flow of heated air based on input from the wool deformation detector.

2. The curing oven according to claim 1, wherein the wool deformation detector comprises a transmitter arranged at a first edge region at one side of the conveyor and a receiver arranged at a second edge region of at an opposite side of the conveyor to transmit an electromagnetic signal transversely through the web.

3. The curing oven according to claim 2, wherein the electromagnetic signal is X-ray.

4. The curing oven according to claim 2, wherein the receiver has a vertical extension of 10-20 mm.

5. The curing oven according to claim 1, wherein the curing oven comprises a plurality of zones, and a wool deformation detector is arranged in at least one of the zones.

6. The curing oven according to claim 5, wherein the wool deformation detector is arranged in the first half of the curing oven seen in direction of transport of the conveyor.

7. A method for curing mineral wool, comprising:
curing mineral wool with a curing oven according to claim 1;
wherein the mineral wool web has a density in the range of 15-50 kg/m³.

8. The method according to claim 7, wherein the mineral wool web is a mineral wool web made of fibres having a median diameter below 3 μm.

9. A method for curing mineral wool in a curing oven comprising the steps of:
advancing a mineral wool web through a substantially closed cabinet from a mineral wool web inlet provided at one end of the cabinet to a mineral wool web outlet provided at another end of the cabinet,
directing a flow of heated air through the conveyor and into the mineral wool web,
detecting potential wool web deformation in the curing oven,
regulating pressure of the flow of heated air based on the detected potential wool web deformation.

10. The method according to claim 9, wherein the step of detecting potential wool web deformation comprises:
emitting an electromagnetic signal transversely through the web from a first edge region,
receiving the electromagnetic signal at a second edge region opposite the first edge region,
analysing the received electromagnetic signal to provide a control value,
generating a first signal if the control value indicates deformation of the wool,
generating a second signal if the control value indicates no deformation of the wool,
the method further comprising a step of regulating the pressure of heated air at the heated air inlet based on the first or second signal.

* * * * *